Dec. 29, 1925.  
C. E. OYLEAR  
1,567,980  
MEANS FOR DISCOURAGING A HEN FROM BROODING  
Filed March 21, 1924

Inventor  
C. E. Oylear

Patented Dec. 29, 1925.

1,567,980

UNITED STATES PATENT OFFICE.

CLAUDE E. OYLEAR, OF EPWORTH, MISSOURI.

MEANS FOR DISCOURAGING A HEN FROM BROODING.

Application filed March 21, 1924. Serial No. 700,844.

*To all whom it may concern:*

Be it known that I, CLAUDE E. OYLEAR, a citizen of the United States, residing at Epworth, in the county of Shelby and State of Missouri, have invented certain new and useful Improvements in Means for Discouraging a Hen from Brooding; and I do hereby declare the following to be a full, clear, and exact description of the invention, such as will enable others skilled in the art to which it appertains to make and use the same.

The invention has for its object to discourage and break up the inclination of a hen to sit and in accordance with the method the hen is confined for a period of time, approximately twenty-four hours, in a coop or other enclosure which is pivoted and balanced so that any excess of weight to one side or the other of a vertical plane passing through the axis of the coop causes the latter to turn with the result that the hen loses all inclination to sit.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Corresponding and like parts are referred to in the following description and designated in both views of the drawings by like reference characters.

Figure 1:
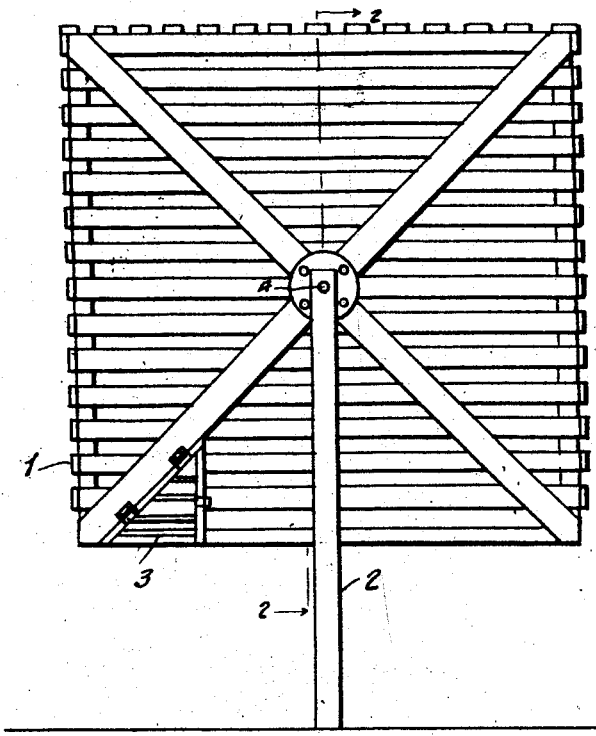
Figure 1 is a side view of an appliance embodying the invention.
Figure 2:
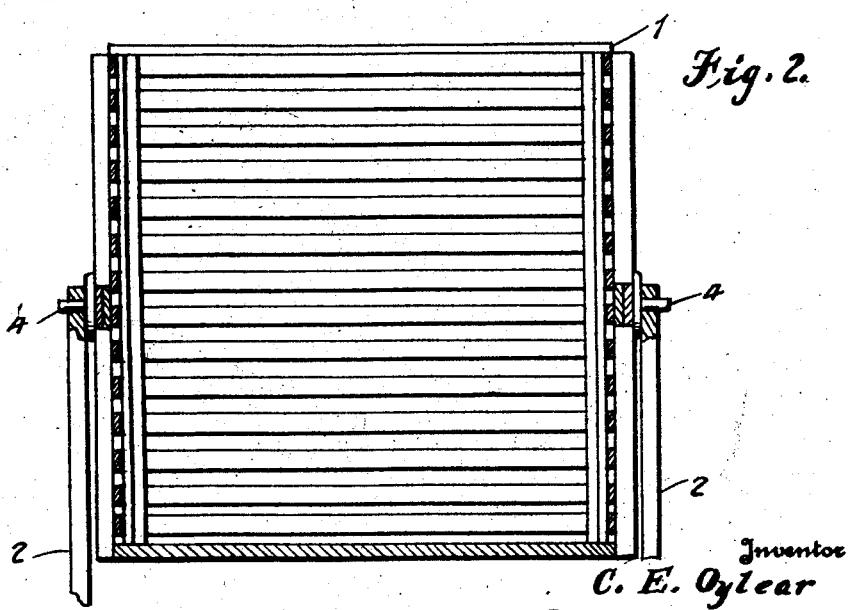
Figure 2 is a vertical transverse sectional view thereof on the line 2—2.

In accordance with the invention, a hen having a tendency to sit is confined for a period of time within a coop or like receptacle which is pivoted so as to turn about a horizontal axis, and in carrying out the invention, a coop 1 is pivoted between uprights 2 which may be let into the ground or supported in any preferred way. The coop is of open construction having the form of a cage and of rectangular outline, whereby ventilation is assured and the hen enabled to feed. A suitable door 3 is provided for the ingress and egress of the hen and after the hen has been placed in the coop, the door 3 is closed and fastened in any preferred way. The journals 4 project outwardly from opposite ends of the coop and are mounted in the upright 2 in any preferred way.

What is claimed is:

1. Means for breaking up the inclination of a hen to brood, the same consisting of a coop pivoted to rotate about a horizontal axis and normally balanced so as to rest with its bottom parallel with the ground.

2. The herein described means for breaking up the inclination of a hen to brood, the same consisting of uprights, and a rectangular coop of cage formation pivoted between the uprights to turn about a horizontal axis and normally balanced.

In testimony whereof I affix my signature.

CLAUDE E. OYLEAR.